(12) United States Patent
Peskar et al.

(10) Patent No.: US 9,136,558 B2
(45) Date of Patent: Sep. 15, 2015

(54) IMPACT RESISTANT BATTERY

(75) Inventors: Justin Peskar, Eagan, MN (US); Martin E. Olson Gunderson, River Falls, WI (US); Majid Entezarian, Hudson, WI (US)

(73) Assignee: Philips Plastics Corporation, Philips, WI (US)

( * ) Notice: Subject to any disclaimer, the term of this patent is extended or adjusted under 35 U.S.C. 154(b) by 1038 days.

(21) Appl. No.: 12/857,423

(22) Filed: Aug. 16, 2010

(65) Prior Publication Data

US 2011/0064997 A1 Mar. 17, 2011

Related U.S. Application Data (60) Provisional application No. 61/234,168, filed on Aug. 14, 2009.

(51) Int. Cl.
*H01M 2/08* (2006.01)
*H01M 10/0525* (2010.01)
*H01M 2/02* (2006.01)
*H01M 2/10* (2006.01)

(52) U.S. Cl.
CPC ........ *H01M 10/0525* (2013.01); *H01M 2/1022* (2013.01); *H01M 2/1094* (2013.01); *H01M 2/02* (2013.01); *H01M 2/10* (2013.01); *H01M 2/1016* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 2,438,965 A | 4/1948 | Dasher | |
| 3,563,846 A | 2/1971 | Harr | |
| 3,801,425 A | 4/1974 | Cook | |
| 4,803,135 A * | 2/1989 | Garoutte | 429/116 |
| 4,904,550 A * | 2/1990 | Kano et al. | 429/163 |
| 6,242,131 B1 * | 6/2001 | Noh | 429/185 |
| 6,428,925 B1 * | 8/2002 | Takeno et al. | 429/163 |
| 6,458,227 B1 | 10/2002 | Hiskey et al. | |
| 6,790,893 B2 | 9/2004 | Nguyen et al. | |
| 7,569,625 B2 | 8/2009 | Keller et al. | |
| 7,612,152 B2 | 11/2009 | Braun et al. | |
| 7,723,405 B2 | 5/2010 | Braun et al. | |
| 2002/0155348 A1 * | 10/2002 | Gitto | 429/163 |
| 2003/0012908 A1 * | 1/2003 | Milhas | 428/36.91 |
| 2003/0125447 A1 * | 7/2003 | Hoch et al. | 524/495 |

(Continued)

FOREIGN PATENT DOCUMENTS

WO WO 2008/048203 4/2008

OTHER PUBLICATIONS

Rebecca Fall, "Puncture Reversal of Ethylene Ionomers—Mechanistic Studies," 2001, Virginia Polytechnic Institute and State University, pp. 1-74).*

(Continued)

*Primary Examiner* — Ula C Ruddock
*Assistant Examiner* — Matthew Van Oudenaren
(74) *Attorney, Agent, or Firm* — Holland & Hart LLP (57) ABSTRACT

An impact resistant battery incorporates one or more improvements that are designed to reduce or eliminate the risk of a fire or explosion caused by a projectile impact, electrical short, or otherwise. The battery is also designed to reduce the amount of structural damage caused by a projectile impact. The battery may have a housing that includes a self-sealing ionomer material. The battery may also be filled with materials that suppress flames and/or prevent the internal temperature from reaching an ignition point.

28 Claims, 2 Drawing Sheets

(56) References Cited

U.S. PATENT DOCUMENTS

| | | | |
|---|---|---|---|
| 2003/0160206 A1* | 8/2003 | Hayes | 252/70 |
| 2004/0169299 A1* | 9/2004 | Davis et al. | 264/4.32 |
| 2005/0034595 A1* | 2/2005 | Kordel et al. | 89/1.14 |
| 2005/0070647 A1* | 3/2005 | Iyoshi et al. | 524/155 |
| 2005/0112461 A1* | 5/2005 | Amine et al. | 429/185 |
| 2007/0176154 A1* | 8/2007 | Murase et al. | 252/601 |
| 2009/0035647 A1* | 2/2009 | Takagi | 429/53 |

OTHER PUBLICATIONS

Kalista et al., "Self-Healing of Poly(Ethylene-co-Methacrylic Acid) Copolymers Following Projectile Puncture," 2007, Mechanics of Advanced Materials and Structures, 14, 391-397.*

Bergman et al., "Mendable Polymers," Journal of Materials Chemistry, vol. 18, pp. 41-62 (Nov. 27, 2007) (22 pp.).

Burst, Ionomers (2005) (4 pp.).

Cordier et al., "Self-Healing and Thermoreversible Rubber from Supramolecular Assembly," Nature, vol. 451, pp. 977-980 (Feb. 21, 2008) (4 pp.).

Doh et al., "Thermal and Electrochemical Behaviour of $C/Li_xCoO_2$ Cell During Safety Test," Journal of Power Sources, vol. 175, pp. 881-885 (Oct. 7, 2007) (5 pp.).

Eisenberg et al., "A New Multiplet-Cluster Model for the Morphology of Random Ionomers," Macromolecules, vol. 23, No. 18, pp. 4098-4107 (1990) (10 pp.).

Expandable Graphite, Asbury Carbons, Anthracite Industries (Feb. 2011) (1 p.).

Expandable Flake Graphite, Asbury Carbons, (see "Date Information" section below for more information) (11 pp.).

Fall, "Puncture Reversal of Ethylene Ionomers—Mechanistic Studies," Masters Thesis, Virginia Polytechnic Institute and State University, (Aug. 29, 2011) (74 pp.).

Fire Barrier 2001 Silicone RTV Foam, 3M Fire Protection Products (1997) (4 pp.).

Fire Barrier Moldable Putty+, 3M Fire Protection Products (1997) (4 pp.).

Interchar 212—Epoxy Intumescent, International Protective Coatings (Apr. 16, 2008) (4 pp.).

Intumet Intumescent Technology, Zero International (2008) (1 p.).

IntuPlas, Pyro Phobic Systems Ltd. (see "Date Information" section below for more information) (1 p.).

Kalista, Jr., "Self-Healing of Thermoplastic Poly(Ethylene-co-Methacrylic Acid) Copolymers Following Projectile Puncture," Masters Thesis, Virginia Polytechnic Institute and State University (Sep. 1, 2003) (75 pp.).

Manchor, "New Concepts in Passive Fire Protection," Aircraft Survivability, pp. 7-9 (Winter 2001/2002) (3 pp.).

Rubber Selection—A Guide to Outline Properties, MERL Ltd. (2008) (8 pp.).

Measuring the Temperature of a Speeding Bullet, Range Rats (Aug. 18, 2005) (2 pp.).

Minkel, "Self-Healing Rubber Keeps on Stretching, Rip after Rip," Scientific American (Feb. 21, 2008) (2 pp.).

Mynar et al., "The Gift of Healing," Nature, vol. 451, pp. 895-896 (Feb. 21, 2008) (2 pp.).

DC315, International Fireproof Technology, Inc. (see "Date Information" section below for more information) (1 p.).

RTS-1 Self Healing Reactive Target System, Fab Molds (2007) (1 p.).

Shen et al., "Recent Advances with Expandable Graphite In Intumescent Flame Retardant Technology," Nayacol Nano Technologies, Inc. (see "Date Information" section below for more information) (7 pp.).

Shigematsu et al., "Thermal Behavior of $C/LiCoO_2$ Cell, Its Components, and Their Combinations and the Effects of Electrolyte Additives," Journal of the Electrochemical Society, vol. 153, No. 11, pp. A2166-A2170 (Sep. 20, 2006) (5 pp.).

Structure and Properties of Crystallizable Ionomers, Princeton University (see "Date Information" section below for more information) (3 pp.).

Surlyn, Properties Grid for Selected Industrial Grades of Surlyn, DuPont (2005) (2 pp.).

Surlyn, Typical Properties for Selected Industrial Grades of Surlyn, DuPont (2005) (3 pp.).

Surlyn, Technical Information: Chemical Resistance, DuPont (Oct. 2000) (8 pp.).

Surlyn, Thermoplastic Resins, DuPont (Aug. 2000) (2 pp.).

Toohey et al., "Self-Healing Materials with Microvascular Networks," Nature.com, Materials, vol. 6, pp. 581-585 (Jun. 10, 2007) (5 pp.).

Trask et al., "Self-Healing Polymer Composites: Mimicking Nature to Enhance Performance," Department of Aerospace Engineering, University of Bristol (see "Date Information" section below for more information) (12 pp.).

Varley et al., "Ionomers as Self Healing Polymers," S. van der Zwaag (ed.), Self Healing Materials. An Approach to 20 Centuries of Materials Science, pp. 95-114 (2007) (20 pp.).

White et al., "Autonomic Healing of Polymer Composites," Nature, vol. 409, pp. 794-797 (Feb. 15, 2001) (6 pp.).

Wu et al., "Self-Healing Polymeric Materials: A review of Recent Developments," Prog. Polym. Sci., vol. 33, pp. 479-522 (Mar. 4, 2008) (44 pp.).

Yamaki et al., "Thermal Stability of Electrolytes with $Li_xCoO_2$ Cathode or Lithiated Carbon Anode," Journal of Power Sources, vol. 119-121, pp. 789-793 (2003) (5 pp.).

* cited by examiner

IMPACT RESISTANT BATTERY

CROSS-REFERENCE TO RELATED PATENT APPLICATIONS

This patent application claims priority to U.S. Provisional Patent Application No. 61/234,168, entitled "Housing for a Battery," filed on 14 Aug. 2009 (the '168 Provisional), the contents of which are incorporated by reference herein in their entirety. In the event of a conflict, the subject matter explicitly recited or shown herein controls over any subject matter incorporated by reference.

GOVERNMENT LICENSE RIGHTS

The U.S. Government has a paid-up license in this invention and the right in limited circumstances to require the patent owner to license others on reasonable terms as provided for by the terms of Contract No. W15P7T-08-C-P031 awarded by the Department of Defense, U.S. Army.

BACKGROUND

Portable electronic devices are becoming more and more prevalent in every aspect of society. The phenomenal increase in the use of these devices has simultaneously increased demand for batteries to power them. The batteries are usually contained within the device or in a separate battery pack. The batteries come in numerous shapes and sizes and may use any of a number of underlying technologies—e.g., lithium ion, nickel metal hydride, and so forth.

One disadvantage of portable electronic devices is that the battery is susceptible to failure, particularly when physically damaged or breached. Physical damage may cause a fire, explosion, or hazardous leak. The risk of failure from physical damage is higher in situations where the battery and device are exposed to extreme conditions such as in the military, construction, and the like.

In the military, soldiers often need to communicate and share information with other troop members and leaders. Soldiers are provided with portable electronic devices that allow effective communication, enhanced situational awareness, and improved fighting capabilities. For example, soldiers may be given electronic GPS units, night vision goggles, two-way radios, illuminated scopes, and so forth.

These devices require an ever increasing number of batteries to keep the soldier operational for extended periods of time. The soldier may be required to carry multiple batteries depending on the number of electronic devices present. The batteries are often placed in close proximity to the soldier's body to maximize mobility and stability.

Rechargeable lithium ion batteries are widely used due to their high energy density and low weight. The drawback of these batteries in a military context is that they can explode or burst into flames when they are pierced or impacted by a bullet or shrapnel. This may cause further injury to the soldier who may already be in a very dangerous situation.

The danger associated with lithium ion batteries has hindered their widespread use in the military. To increase the adaptation of lithium ion power sources by the military, many of the known problems must be addressed by modification of the cell chemistry and/or packaging of military battery packs.

Researchers have extensively investigated the lithium ion chemistry with the goal of creating abuse tolerant lithium ion cells. Many of these studies have focused on investigating the thermal and electrochemical contributions to lithium ion battery fires. It is widely believed that the survival of a lithium ion cell is dependent upon the relative rate of heat removal and heat generation. In the case where heat generation is greater than heat removal, "thermal runaway" will occur. It has been determined that thermal runaway for lithium cobalt oxide, a component found in many lithium ion batteries, began at approximately 180° C. for a fully charged cell.

SUMMARY

Various embodiments of a battery are disclosed that are capable of reducing and/or preventing the battery from catching fire or exploding due to a sudden discharge produced by, for example, a short or a projectile impact. In one embodiment, the battery includes a housing that prevents and/or reduces oxygen transmission into the interior of the battery. Eliminating or reducing the amount of oxygen helps to prevent and/or reduce the intensity of any resulting fires. The housing may also dissipate the heat generated by the projectile and thereby help prevent the battery from catching fire.

In one embodiment, the housing may include an ionomer that forms a self-sealing barrier around the electrochemical cells in the interior. The ionomer's physical properties enable it to completely or partially self-seal the opening created by a projectile.

The ionomer may include acid groups that have been neutralized with alkali cations. For example, the ionomer may include acid groups that have been neutralized with sodium and/or magnesium ions. In one embodiment, the ionomer includes poly(ethylene-co-methacrylic acid).

The ionomer may be mixed with other materials that increase its resistance to fire or provide it with other desirable properties. For example, the ionomer may be mixed with a flame retardant material such as decabromodiphenyl ether and/or antimony trioxide. The ionomer may also be mixed with an intumescing material such as expanding graphite and the like. The ionomer may also be mixed with both a flame retardant material and an intumescing material.

The housing may be constructed of a single material or as separate layers of different materials. In one embodiment, the housing may be constructed entirely or substantially entirely of a material that includes the ionomer. The material may also include other components such as the flame retardants already mentioned.

The housing may be constructed of multiple layers of material coupled together. For example, the housing may include one layer that includes the ionomer and prevents or reduces oxygen inflow and another layer of a rigid support material that forms the outer shell of the housing. The layers may be coupled together mechanically, chemically, or in any other suitable manner.

The space in the battery that is not taken up by the electrochemical cells may be filled with materials that prevent the battery from catching fire. These filler materials may absorb the heat by, for example, undergoing a phase change or may quickly distribute the heat away from the impact area to prevent a localized temperature increase that ignites the battery.

The filler material may be any material that prevents or reduces the likelihood of the battery catching fire. Lighter materials are preferred to reduce the overall weight of the battery. Examples of suitable materials include silicone oil, microencapsulated wax (the wax undergoes a phase change at a temperature below the ignition temperature of the battery), and/or carbonate salts such as sodium bicarbonate.

The foregoing and other features, utilities, and advantages of the subject matter described herein will be apparent from the following more particular description of certain embodiments as illustrated in the accompanying drawings.

It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

DETAILED DESCRIPTION

A number of embodiments of impact resistant batteries are described herein. The batteries incorporate one or more improvements that are designed to reduce or eliminate the risk of a fire or explosion caused by a projectile impact, electrical short, or otherwise. It should be understood that the various improvements and embodiments may be combined with each other to form numerous additional embodiments.

The batteries disclosed herein may be especially useful in situations where there is an elevated risk of the batteries being punctured by a projectile or other object and/or catching fire or exploding when breached or shorted. Examples of the former include batteries that are used in the military, heavy industry, construction, and so forth. Examples of the latter include lithium ion batteries and other batteries that use highly reactive materials or have high energy densities.

It should be appreciated that although batteries having the features described herein may be especially useful in the above situations, they may also be desirable in other less extreme situations. The features and advantages described herein can be incorporated into almost any battery.

Figure 1:
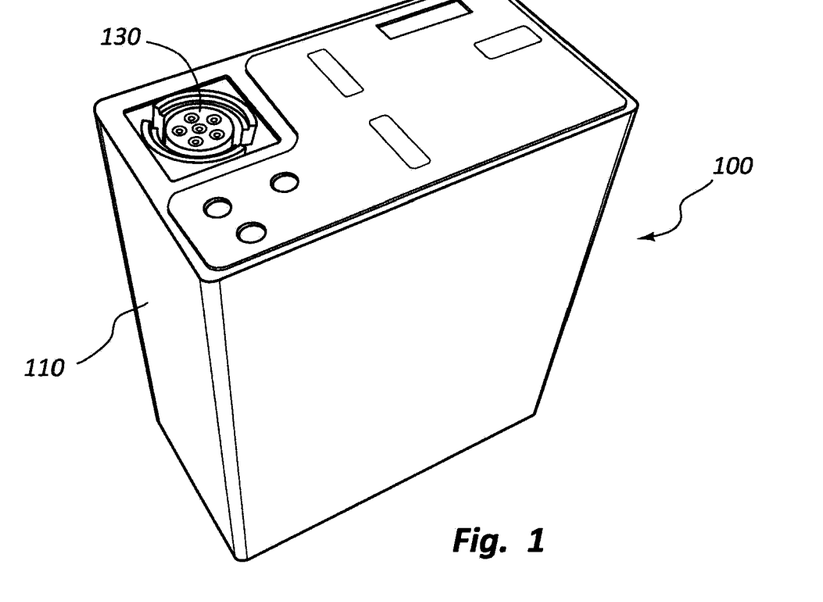
FIG. 1 is a perspective view of one embodiment of an impact resistant battery.

FIG. 1 illustrates one embodiment of an impact resistant battery 100. The battery 100 includes a housing 110 that encloses twenty four electrochemical cells 120. The electrochemical cells 120 are electrically coupled together to provide power to the connector 130.

The battery 100 shown in FIG. 1 (and the other Figs.) is modeled after the BB 2590 rechargeable lithium ion battery commonly used in the military. This is a good example of a battery for which impact and fire resistance may be especially desirable properties.

Like the BB 2590, the electrochemical cells 120 are preferably rechargeable lithium ion cells. Lithium ion cells offer a number of advantages. They are lightweight, store a lot of power, and can be repeatedly charged and discharged without significantly affecting the battery's overall charge capacity. The battery 100 may be configured to withstand extreme conditions. In one embodiment, the battery 100 may be capable of undergoing 1200 recharging cycles or more without exhibiting any significant memory effect. Memory effect occurs when a battery is repeatedly charged after being only partially discharged. The battery appears to remember the smaller capacity. The battery 100 may also be relatively lightweight and capable of operating in temperatures ranging from −50° C. to 75° C.

It should be appreciated that the battery 100 can have any of a number of other configurations beyond what is depicted in the Figs. For example, the size and shape of the battery 100 may be altered as desired. The '168 Provisional contains illustrations of a variety of different battery designs that may be used.

The number and type of electrochemical cells 120 used in the battery 100 may be altered as well. Instead of lithium ion cells, the battery 100 may include nickel metal hydride, lead acid, or any other suitable cell. The battery preferably uses secondary or rechargeable cells, but it can also use primary or non-rechargeable cells.

The housing 110 may include an ionomer that forms a self-sealing barrier around the electrochemical cells 120 in the interior thereby reducing or preventing oxygen from entering the battery 100. Ionomers are copolymers in which a small portion of the monomer units have ionic pendant groups. The polar ionic groups cluster together separately from the nonpolar bulk polymer chains. These clusters give ionomers their unique physical properties such as modulus and viscosity.

The cluster formations give rise to multiple glass transition temperatures in the polymer. At room temperature, the clusters form pockets of polymer crystals and amorphous regions. As the temperature increases above the order-disorder temperature, some of the polymer crystals melt thereby increasing the amorphous content. If the temperature increases further the ionomer completely melts much like a standard thermoplastic polymer. As the temperature decreases, the polymer regions begin to crystallize and rapidly go back to the disordered state. The ionic clusters reform as well, but much more slowly.

While not wishing to be bound by theory, it is hypothesized that this two-stage melting and solidification allows the ionomer to heal from ballistic events. As a projectile, such as a bullet, penetrates the ionomer material the temperature rises above the melting point of the material and allows the bullet to push the ionomer out of the way and pass through. After the bullet passes through, the ionomer rebounds and quickly condenses again. This condensation is followed by the physical cross linking of the ionic clusters over a period of time giving the ionomer the strength of the non affected polymer.

The ionomer may include acid groups distributed randomly throughout the polymer. In one embodiment, the ionomer may include 2 to 8 mol % of methacrylic acid groups. The acid groups may be partially neutralized with one or more alkali cations such as sodium or magnesium. In one embodiment, at least 10% of the acid groups and not more than 90% of the acid groups have been neutralized. The acid groups may also be included without being neutralized in any appreciable way.

Any suitable ionomer may be used. In one embodiment, the ionomer includes partially neutralized poly(ethylene-co-methacrylic acid). Ionomers such as this can be obtained from DuPont under the trade name Surlyn. Different grades may be obtained depending on the amount of acid present, the extent of acid neutralization, and the type of cation used to neutralize the acid. Suitable examples include Surlyn 8940, 8920, 8660, 8140, PC2000, and 6120. Surlyn 6120 is neutralized with magnesium ions while most of the rest are neutralized with sodium ions.

Ionomers having acid groups that have not been neutralized may also be used. For example, the ionomer may include poly(ethylene-co-methacrylic acid) without any of the acid having been neutralized. This material may be obtained from DuPont under the trade name Nucrel. Different grades are available depending on the amount of acid present and the molecular weight of the polymer. Suitable examples include Nucrel 925 and 960.

Commercially available proprietary ionomers may also be used. An example of such a material is React-A-Seal polymer available from Fab Defense. This material includes Surlyn 8940 plus proprietary additives.

The ionomer may have a melting point that is no more than the temperature to which the projectile heats the impact site. As explained above, it is believed that the projectile heats the ionomer at the impact site to a temperature that is above the ionomer's melting point thereby producing the observed self-sealing effect.

The melting point of the ionomer (or material that includes the ionomer) may be no more than approximately 150° C., no more than approximately 140° C., or no more than approximately 130° C. The melting point of the ionomer (or material that includes the ionomer) may be at least approximately 60° C., at least approximately 70° C., or at least approximately 80° C. The melting point may also be in a range having end points defined by any of these temperatures (e.g., melting point of approximately 70° C. to 150° C.).

It should be appreciated that the ionomer, or the material in which it is included, may completely seal a projectile puncture or only partially seal the puncture depending on the situation. However, in the vast majority of cases, the ionomer should provide a significant improvement over conventional materials.

In one embodiment, a flame retardant may be added to the ionomer. The resulting material may be incapable of sustaining a fire even after being exposed to direct flame. Suitable flame retardants include decabromodiphenyl ether and/or antimony trioxide. These two materials may be added to the ionomer in a ratio that ranges from 1:1 to 3:1 of decabromodiphenyl ether to antimony trioxide.

The overall mixture may include no more than approximately 40 wt % flame retardant, no more than approximately 30 wt % flame retardant, or no more than approximately 20 wt % flame retardant. The mixture may include at least approximately 1 wt % flame retardant, at least approximately 5 wt % flame retardant, or at least approximately 8 wt % flame retardant. The mixture may also include the flame retardant in an amount that is in a range having end points defined by any of the aforementioned amounts (e.g., approximately 5 wt % to 40 wt %).

An intumescing material may be added to the ionomer to form a homogenous compound that is fire resistant. An intumescent material is a material that increases in volume and decreases in density when exposed to heat. It may be added to the ionomer to complement the ionomer's self-sealing properties. As the ionomer is heated by a projectile, the intumescent material may expand to fill the puncture hole and cut off the oxygen supply to the interior of the battery 100.

Suitable intumescing materials include expanding graphite, a commercial proprietary product known by the trade name CeaseFire, and the like. The expanding graphite may be obtained from Anthracite Industries, which is a division of Asbury Carbons, as product numbers 3570 and 3772. The 3570 powder expands 245% and the 3772 powder expands 290%. The ionomer and the intumescing materials may be combined as a dry mixture and then fed into an injection molding machine where the ionomer melts and the intumescing material is incorporated into the polymer matrix.

The mixture should include a sufficient amount of intumescing material to enhance the mixture's fire protection properties without adversely affecting the self-sealing properties of the ionomer. In one embodiment, the mixture may include no more than approximately 25 wt % intumescing material, no more than approximately 20 wt % intumescing material, or no more than approximately 15 wt % intumescing material. The mixture may include at least approximately 1 wt % intumescing material, at least approximately 3 wt % intumescing material, or at least approximately 5 wt % intumescing material. The mixture may also include the intumescing material in an amount that is in a range having end points defined by any of the aforementioned amounts (e.g., approximately 3 wt % to 15 wt %).

The ionomer may also be combined with a number of other filler materials to further modify its physical properties. For example, glass fibers may be added to the ionomer to provide additional strength. The resulting material may include no more than approximately 15 wt % filler material, no more than approximately 10 wt % filler material, or no more than approximately 5 wt % filler material.

It should be appreciated that the ionomer may be combined with any combination of the foregoing materials in any of the amounts given to create additional mixtures. It should be understood that the term "mixture" may refer to a solid or free-flowing material that contains one or more separate components. The former situation may be referred to as a solid mixture and the latter may be referred to as a free-flowing mixture. Additional details regarding the ionomer and suitable additives can be found in the examples below and in the '168 Provisional.

The housing 110 may have any of a number of configurations. In one embodiment, the housing 110 may be made entirely of a single material. For example, any of the materials discussed previously may be used to make the entire housing 110. The housing 110 may also be made of a single material that does not include an ionomer. This may be desirable in situations where the battery 100 includes a heat absorbing filler material such as those described below.

Figure 2:
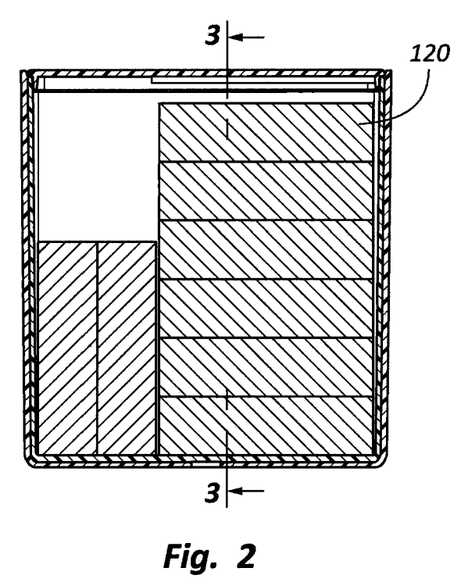
FIG. 2 is a front cross-sectional view of another embodiment of the impact resistant battery.
Figure 3:
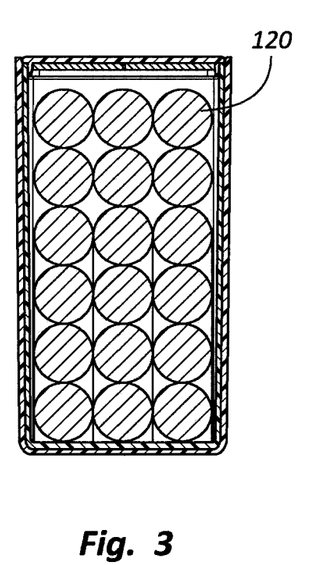
FIG. 3 is a side cross-sectional view along line 3-3 in FIG. 2.
Figure 4:
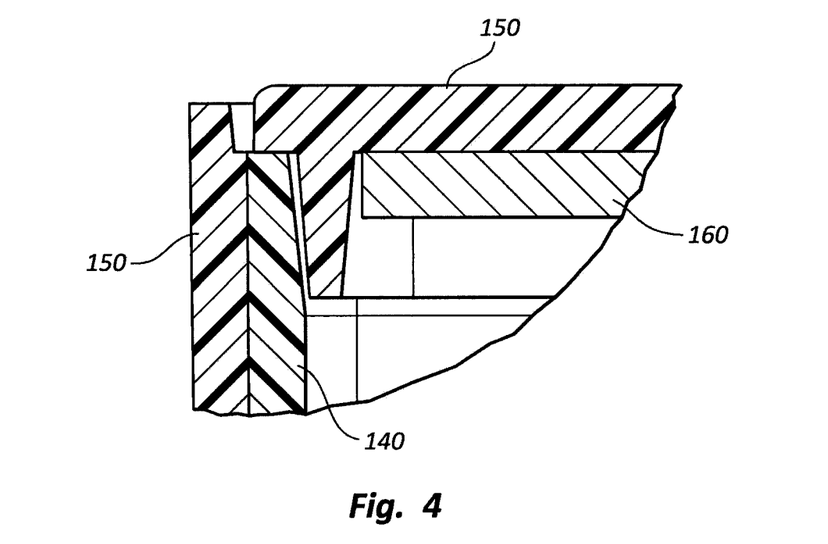
FIG. 4 is a magnified view of the upper left corner of the housing for the battery shown in FIG. 2.

In another embodiment, the housing 110 may be made of multiple layers of different material. FIGS. 2-4 depict one embodiment of the housing 110 that includes multiple layers of material. A first layer 140 includes the ionomer and is positioned on the inside of the housing 110. A second layer 150 is made of a strong rigid material and forms the outer shell of the housing 110. A third layer 160 is provided under the top side of the housing 110 and may be similar in composition to the first layer 140

The second layer 150 may be made of any material capable of providing a protective outer shell around the battery 100. Examples include polycarbonate, acrylonitrile butadiene styrene, and/or polypropylene. These may be reinforced with filler materials such as glass fibers and the like.

The layers may be coupled together in any suitable manner. They may be chemically bonded together, joined with adhesive, or mechanically coupled together. If the materials are chemically compatible, they may naturally bond or adhere to each other during the manufacturing process. For example, the two layers may be joined together as part of an injection molding process.

The layers may be mechanically coupled together in a variety of ways. In one example, the housing 110 may be injection molded and the layers may be coupled together using keyholes which are drilled into the layer that is formed first. The next layer is injection molded so that some of the material fills the keyholes in the initial layer thereby interlocking the layers. This same technique may be used to couple three or more layers together as well.

The housing 110 may be manufactured using any suitable process. In one embodiment, the housing 110 is injection molded. A multi-shot injection molding process may be used to make the multi-layer embodiments of the housing 110. A multi-shot process may also be used to make the single material embodiments of the housing 110. Even though the housing 110 may be made of a single material, it may be formed by injection molding one layer onto another layer. The single material embodiments may also be made in a single shot injection molding process.

The housing 110 may have any suitable thickness. The thickness of the housing 110 may be minimized to eliminate excess weight from the battery 100. However, it should not be so thin that the ionomer or other materials are unable to prevent or reduce fires caused by a projectile impact.

In one embodiment, the housing 110 may be no more than approximately 3.0 mm thick, no more than approximately 2.5 mm thick, or no more than approximately 2.0 mm thick. The housing 110 may also be at least approximately 0.5 mm thick, at least approximately 1.0 mm thick, or at least approximately 1.5 mm thick. The housing 110 may also have a thickness that is in a range having end points defined by any of the aforementioned thicknesses (e.g., thickness of approximately 0.5 mm to 2.0 mm).

The battery 100 may also be filled with materials that suppress flames and/or prevent the internal temperature from climbing to the point that the battery 100 experiences thermal runaway. As shown in FIG. 3, the electrochemical cells 120 are cylindrical in shape and form voids when placed in the housing 110. The additives or filler materials are included in the voids between the electrochemical cells 120. In one embodiment, at least part of the space in the housing 110 that is not taken up by the cells 120 is filled with one of these additives.

In one embodiment, the voids in the battery 100 may be filled with phase change wax. Heat generated by the projectile is absorbed by the wax as it undergoes a phase change from a solid to a liquid. The wax may be melted and initially added to the housing 110 in molten form. However, due to the high temperature of the molten wax, it is preferred to use a microencapsulated phase change wax that can be added without heating. The microencapsulated wax may be obtained from Microtek as product MPCM52. The average diameter of the encapsulated way may be approximately 200 microns.

In another embodiment, the voids may be filled with an alkali carbonate salt such as sodium bicarbonate. Sodium bicarbonate is a common material used to extinguish fires. In a fire, the sodium bicarbonate begins to slowly decompose at approximately 50° C. into sodium carbonate, water, and $CO_2$. The sodium bicarbonate rapidly decomposes at approximately 250° C. The sodium bicarbonate is preferably microencapsulated and added to the battery 100 in that form since plain sodium bicarbonate will corrode any exposed metal. After the battery 100 is filled with sodium bicarbonate, it may be desirable to remove any air from the inside of the battery 100 in a vacuum process.

In another embodiment, the battery 100 may be filled with silicone oil having a viscosity of approximately 10,000 to 30,000 centistokes (cSt). For comparison, this range of viscosity covers materials such as chocolate syrup and honey. The silicone oil is viscous enough to fill the voids in the battery 100, but not so runny that it will rapidly drain if the housing 110 does not fully self-seal.

Silicone oils have other physical properties that make them suitable for use as a packing material in the battery 100. Silicone oils have a relatively high flash point (greater than 320° C.) and have a low coefficient of thermal expansion. Silicone oils also do not freeze, which gives them a wide operating temperature range. Silicone oils also have a thermal conductivity of 0.4 W/m*° K. This is a bit lower than most metals (10-400 W/m*° K), but is greater than mineral oil (0.138 W/M*° K), which is commonly used in transformers as a heat transfer liquid.

EXAMPLES

The following examples are provided to further illustrate the subject matter disclosed herein. The following examples are for those materials and embodiments that initially showed the most promising results. The tests for the other materials can be found in the '168 Provisional. Additional details for each example below can also be found in the '168 Provisional.

Materials and Method

The examples present the results of bullet impact tests performed on fully charged batteries and samples of material that may be used as the battery housing. The impact tests were performed by firing a bullet into a fully charged battery or material sample using an FN-SPR .308 caliber rifle. The bullet was 123 grains and had a full metal jacket.

The batteries were shaped and sized to be similar to the BB 2590 battery commonly used by the military. Like the BB 2590, each battery contained 24 conventional 18650 cells electrically connected together.

Figure 5:
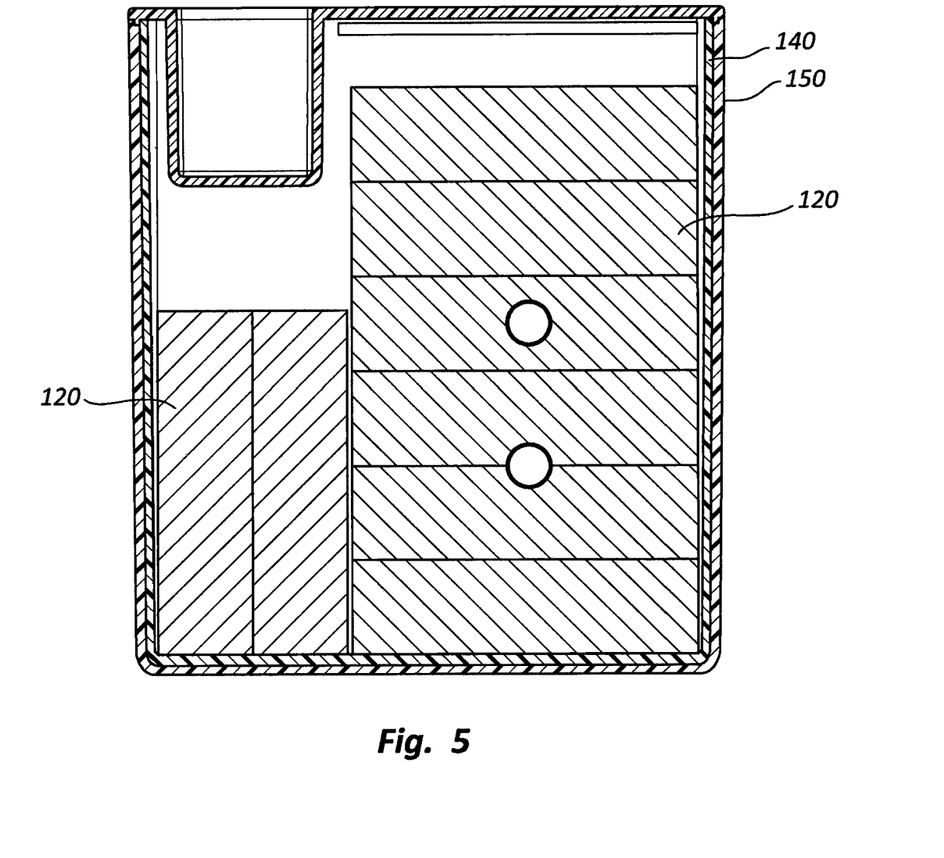
FIG. 5 is a cross-sectional view of another embodiment of an impact resistant battery showing the bullet impact locations tested in the examples section.

Two bullet strike scenarios were considered for each battery. The first occurs when the bullet strikes an internal cell of the battery directly in the center. The second occurs when the bullet splits two cells apart. From here on, the former will be referred to as a direct shot and the latter as a split shot. The bullets were fired perpendicular to the battery and the internal cells. FIG. 5 illustrates the shot placement under each scenario.

Example 1

Conventional BB 2590 Battery

The impact of a bullet on a fully charged conventional BB 2590 battery was investigated in this example. The battery was manufactured by Ultralife as model UBI-2590. The temperatures inside the battery were measured using thermocouples. The test was repeated multiple times for both a direct shot and a split shot.

A direct shot caused an initial jet of flame followed by the battery burning continuously until it was either extinguished in water or burned out. When the battery burned itself out, cells exploded and landed several feet away. The battery was completely destroyed leaving only the metal wires and cell canisters. The temperature inside the battery greatly exceeded the thermal runaway temperature of 180° C.

Physical damage to the battery was manifest as a small entrance hole on the front side and a large exit hole on the back side. Most of the back of the housing was ejected along with several cells.

A split shot produced similar results in that the battery immediately burst into flames. One battery didn't burst into flames until a second shot, but overall the tests show that a bullet impact almost always produced a fire.

Split shots produced physical damage that is similar to that of a direct shot. There was a small entrance opening and a large exit opening. A large portion of the housing was ejected along with several cells. In both the direct shot and the split shot, the bullet disintegrated significantly and likely contributed to the damage present on the back side of the battery.

This test confirmed that a fully charged BB 2590 battery burns almost instantaneously after being impacted by a bullet. The reactive nature of the battery seems to be largely independent of shot placement and physical destruction of the battery.

Example 2

Ionomer Materials

Ionomer materials were tested to determine how they would be affected by a bullet impact. The four materials tested are shown in Table 1. Each material was used to prepare a plaque that was shot with the test rifle in the manner described above.

TABLE 1

Ionomer Materials

| Material | Thickness (in) | Melt Temp (° C.) | Tensile Strength (PSI) | Stress Limit (% Elongation) | Melt Index (g/10 min) |
|---|---|---|---|---|---|
| Surlyn 8940 | 0.1 | 92 | 4800 | 256 | 2.8 |
| Surlyn 6120 | 0.1 | 85 | 2900 | 270 | 1.1 |
| Nucrel 925 | 0.1 | 92 | — | — | 25 |
| React-A-Seal | 0.25 | — | — | — | — |

Additional details about each material are given as follows. Nucrel 925 is poly(ethylene-co-methacrylic acid) having 5.4 mol % methacrylic acid randomly distributed throughout the polyethylene polymer chains. Surlyn 8940 also contains poly(ethylene-co-methacrylic acid) with 5.4 mol % methacrylic acid. However, approximately 60% of the methacrylic acid groups in Surlyn 8940 have been neutralized with sodium cations. Surlyn 6120 is similar to 8940 except that 6120 contains more methacrylic acid and is neutralized with magnesium ions. The React-A-Seal polymer contains Surlyn 8940 with proprietary additives and can be obtained from Fab-Defense.

The Surlyn 8940 sample produced a wound that was the same size as the bullet. The wound morphology indicated that the bullet produced different levels of stress heating in the material. This produced viscous, molten polymer flows that sealed the hole after the bullet passed through. Although the hole was sealed, the plug was not without defects. There were a significant number of air pockets formed by solidified polymer strands throughout the plug. The test also indicated that the bullet heated the Surlyn 8940 to a maximum temperature of 130° C.

The Surlyn 8940 sample was also shot with a hollow-point .45 caliber bullet, a round nose .45 caliber bullet, and a hollow point .308 caliber bullet. In all three situations, the material either self-sealed completely or significantly reduced the size of the hole produced by the bullet. Additional details regarding this example, including pictures of the material, can be found in the '168 Provisional.

The Surlyn 6120 sample also self-sealed after impact. The wound morphology was similar to that of the Surlyn 8940 sample. The Nucrel 925 sample did not completely seal the opening, but it reduced the size of the hole. Overall, the Surlyn samples seemed to perform better than Nucrel.

The React-A-Seal sample produced an entrance wound that contained a large crater approximately the diameter of the bullet and showed no crazing around the crater. This indicates that the polymer completely melted upon impact. The exit wound was similar to the Surlyn samples and it appeared to self-seal. React-A-Seal required a significantly thicker sample to self-seal than the Surlyn samples. For this reason, the Surlyn samples were viewed as being superior.

Example 3

Multi-Layer Ionomer Materials

In this example, multi-layer materials that include ionomers were evaluated to determine how they would be affected by a bullet impact. The multi-layer materials were formed by injection molding each layer in a multi-shot process. As the name suggests, the process begins by first injecting (shooting) one layer of polymer and allowing it to partially cool before shooting a second material onto the first. This method can be used to make the housing of the battery out of multiple layers of material.

The multi-layer ionomer materials shown in Table 2 below were made using a multi-shot process. The VLF-PP refers to a long glass fiber filled polypropylene that was obtained from RTP Company as product number VLF 80107. The PC/ABS refers to polycarbonate/acrylonitrile butadiene styrene polymer. The materials were made with a two shot molding tool that allowed a base resin such as PC/ABS or VLF-PP to be molded first followed by a second layer of Surlyn 8940.

TABLE 2

Multi-Layer Ionomer Materials

| | Material | Thickness (in) | Hardness | Tensile Strength (PSI) | Bonded |
|---|---|---|---|---|---|
| Layer 1 | Surlyn 8940 | 0.1 | 65D | 4800 | Yes |
| Layer 2 | Surlyn 8940 | 0.1 | 65D | 4800 | |
| Layer 1 | Surlyn 8940 | 0.1 | 65D | 4800 | semi |
| Layer 2 | VLF-PP | 0.1 | 85D | 1700 | |
| Layer 1 | Surlyn 8940 | 0.1 | 65D | 4800 | No-physical bond |
| Layer 2 | PC/ABS | 0.1 | 65D | Not Listed | |

As shown in Table 2, the two Surlyn layers bond together very well. The Surlyn and VLF-PP layers bonded together satisfactorily, but not great. The Surlyn and PC/ABS layers did not bond together at all. The combination of Surlyn and PC/ABS may be held together mechanically through the use of keyholes.

The material having two layers of Surlyn was shot with the rifle and it performed the same as the single Surlyn layer tested above. The Surlyn 8940/VLF-PP material performed relatively well in the projectile impact test. The polymer layer delaminated from the VLF-PP layer near the impact site and the layers were separated by 1.5 mm. The VLF-PP was completely removed at the impact site by the bullet and pushed between the two layers. The Surlyn was still able to effectively seal the hole.

The Surlyn 8940/PC/ABS material successfully self-sealed after being shot by the rifle. However, the two layers separated during testing due to the lack of a physical bond. Mechanical interlocks may be required to hold the two layers together. This may be accomplished as part of the multi-shot molding process. For example, the first shot may be designed to leave some recesses in the first material that is filled by the second material. The shape of the recess may prevent the second material from separating.

Example 4

Ionomers and Intumescing Materials

In this example, a mixture of an ionomer material and various intumescing materials was evaluated to determine how it would be affected by a bullet impact. Three different intumescing materials were combined with the ionomer to form the test samples. The first two intumescing materials were graphite powders obtained from Anthracite Industries (a division of Asbury Carbons) as product numbers 3570 and 3772. The 3570 powder expands 245%, and the 3772 powder expands 290%. The third material was a commercial product sold under the trade name CeaseFire.

Three formulations of 5 wt %, 10 wt %, and 15 wt % were prepared using each intumescing material. The remainder of each formulation was Surlyn 8940. The formulations were made by dry mixing Surlyn 8940 and the intumescing material and then feeding the mixture into a Toyo Si-110III all electric injection molding machine to produce a small test plaque. The materials molded nicely and did not set off the intumescing material although the process temperatures were reduced for the CeaseFire samples.

Impact tests showed that all six graphite formulations completely self-sealed. The exit scars indicated that the self-sealing ability of the material was adversely impacted as more graphite was added. It is believed that formulations having much higher graphite content would not completely self-seal.

The three formulations containing CeaseFire did not completely self-seal. However, the visible hole in the material appeared larger than it really was. The center of the hole was almost, but not quite, completely blocked. Although the CeaseFire formulations did not completely self-seal, they came close.

Example 5

Ionomers and Flame Retardants

In this example, a mixture of an ionomer material and a flame retardant was evaluated to determine how it would be affected by a bullet impact. The flame retardant was a combination of decabromodiphenyl ether and antimony trioxide in about a 2:1 ratio. Two formulations were prepared which included 20 wt % and 30 wt % of flame retardant with the rest being Surlyn 8940. The formulations were processed to make the samples using the same process as the ionomer/intumescing compounds prepared above.

The samples were shot with the rifle to test their impact properties. Neither formulation completely self-sealed. The samples also showed some signs of stress cracks. The different loadings behaved similarly except that the higher loading showed slightly more brittle fracturing than the lower loading. Although the samples didn't completely self-seal, they still sealed most of the hole.

Example 6

Battery Filled with Microencapsulated Phase Change Wax

In this example, the fire prevention effectiveness of filling the voids in the battery with a microencapsulated phase change wax was evaluated. The phase change wax is a material that absorbs energy as it changes phase from a solid to a liquid. The wax was encased in a melamine-formaldehyde polymer shell. The encapsulated wax was a semi free-flowing, dry product having an average particle size of 200 microns. The wax was obtained from Microtek Labs as product MPCM52. The battery was filled with the encapsulated wax (one advantage of using encapsulated wax is that it can be added to the battery at room temperature versus wax that must be added as a molten liquid).

The encapsulated wax performed very well in the split shot test. The internal temperature of the battery rose quickly near the site of the impact and topped out at 125° C., which was below the thermal runaway temperature. The only cells that were damaged were those that were hit by the bullet. The battery did not catch fire and burn even though the housing sustained significant damage where the bullet exited.

The direct shot test did not perform as well. Seconds after the battery was hit by the bullet it burst into flames and continued to burn until it was dropped in water. It is postulated that this failure was due to the inability of the encapsulated wax to flow freely to the impact site. The wax may likely be encapsulated using a different technique that allows it to flow freely, although this was not tested.

Example 7

Battery Filled with Microencapsulated Sodium Bicarbonate

In this example, the fire prevention effectiveness of filling the voids in the battery with microencapsulated sodium bicarbonate was evaluated. Sodium bicarbonate extinguishes fires by decomposing to form sodium carbonate, water, and carbon dioxide. The speed of the reaction increases as the temperature of the sodium bicarbonate increases. Sodium bicarbonate is an oxidizer and will corrode metal in the battery. The sodium bicarbonate was encapsulated in a polymer shell to prevent this from happening. The shell prevents corrosive reactions, but still allows the sodium bicarbonate to thermally degrade and extinguish a fire. The material flowed freely and included particles having an average size of 100 microns.

The encapsulated sodium bicarbonate was added to a battery, which was then shot with the rifle using the split shot scenario described above. The sodium bicarbonate increased the weight of the battery by 23% and was significantly higher than the phase change wax. The difference can be explained by the greater density of sodium bicarbonate. The test was repeated.

The split shot test results showed that the microencapsulated sodium bicarbonate performed well. The battery did not reach thermal runaway and catch fire. Also, the maximum internal temperature was 120° C., which is not high enough to cause thermal runaway.

Example 8

Ionomer (Surlyn 8940) Battery Housing and Silicone Oil Filler

In this example, a battery having an ionomer housing and filled with silicone oil was tested to determine how it is affected by a projectile impact. The housing was made by injection molding two layers of Surlyn 8940 together using the two shot injection molding process described above. The interior of the battery was filled with either 10,000 centistokes silicone oil or 30,000 centistokes silicone oil. The silicone oil was added to function as a heat sink medium. The range of viscosity of the silicone oils that were tested covers common compounds such as chocolate syrup and honey. The silicone oil is viscous enough to fill the voids in the battery but not rapidly drain out when the battery is punctured.

Silicone oil having the specified viscosities was added to a battery by pouring it into the interior. The silicone oil was added slowly to minimize air entrapment. The battery was also placed under a vacuum to help remove any residual trapped air. The silicone oil increased the weight of the battery by 22%. The battery containing the 10,000 centistokes oil was shot with the rifle using the split shot scenario, and the battery containing the 30,000 centistokes oil was shot using the direct shot scenario.

The results of the test on the battery containing 10,000 centistokes silicone oil are given as follows. Overall this combination performed well. The battery did not catch fire and burn. Temperature readings showed that the battery reached a maximum internal temperature of approximately 130° C. three minutes into the test, which is well under the thermal runaway temperature. The temperature readings also show that twenty five seconds into the test the temperature rise became noticeably slower. It is believed that at this time, the silicone oil began to flow to the impact area and absorb excess heat.

Thermal video corroborates that the 10,000 centistokes silicon oil helped moderate the temperature rise. The video shows silicone oil existing the battery thirty seconds after the bullet strike. Before silicone oil filled the exit hole, smoke was clearly visible in the thermal video. Once the silicone oil filled the exit hole, smoke was no longer visible and oil was seen leaking out of the housing.

The Surlyn housing largely held up even though it may not have completely self-sealed. The entrance side of the battery had a 0.5 mm hole in it and the exit side had a 10 mm X shaped crack. Both the entrance and exit sides leaked silicone oil. The Surlyn case held together much better than the conventional housing and even most of the other housings that have been tested.

The results of the test on the battery containing 30,000 centistokes silicone oil are similar to that of the 10,000 centistokes silicone oil. Once again, the battery did not thermally runaway and reached a maximum internal temperature of approximately 120° C. The higher viscosity oil may have contributed to the lower maximum temperature. Also, the rate of temperature rise moderated considerably 35 seconds after impact. This is believed to have happened for the same reasons explained in connection with the 10,000 centistokes silicone oil.

The Surlyn housing performed similarly to the previous test. However, in this test, the entrance hole completely self-sealed and did not allow silicone oil to leak out. The exit hole was very similar to the previous test and even had a similar X shaped crack that was approximately 10 mm in diameter. The hole was not as well sealed as the earlier one which allowed more silicone oil to leak out. The larger loss of silicone oil did not seem to impede the performance of the system.

Example 9

Ionomer (Surlyn 6120) Battery Housing with Silicone Oil Filler

In this example, a battery having a housing made of Surlyn 6120 is tested to determine how it is affected by a projectile impact. The battery is the same as the one from the previous example except that the housing is made out of a different material. The same two grades of silicone oil (10,000 and 30,000 centistokes silicone oil) were added to the battery and tested using the split shot scenario described previously.

The results of the test on the battery having a housing made of Surlyn 6120 and filled with 10,000 centistokes Silicone oil are given as follows. This combination of materials successfully prevented the battery from catching fire. The temperature response was different than the previous example. The temperature fluctuated more and only reached a maximum of 85° C. before slowly cooling. Overall, the maximum temperature was lower, but the cool down time increased.

Physically, the Surlyn 6120 housings did not perform as well as the Surlyn 8940 housings. The entrance hole self-sealed and did not allow silicone oil to leak out. However, the exit side showed greater damage. The electrochemical cells were pushed up the side wall of the housing causing damage to a third row of cells. Some cell casings were pushed through the back wall giving the case two distinct exit points. Closer inspection revealed that one hole was the bullet exit hole and it had the characteristic 10 mm diameter, X-shaped crack that was observed in the previous example. This hole was mostly closed. The second hole was a 22 mm long crack caused by a metal cell canister that penetrated the housing wall.

The results of the test on the Surlyn 6120 battery which was filled with 30,000 centistokes silicone oil are given as follows. This combination of materials also prevented the battery from catching fire. The temperature response was similar to that of the previous battery except that the maximum temperature was approximately 100° C. The battery also did not cool as rapidly as the Surlyn 8940 batteries.

The physical damage to the Surlyn 6120 housing was greater than the Surlyn 8940 housings. The entrance hole was similar, but the X-shaped exit hole was replaced by a large cut that was 41 mm in length and 4 mm in width at the widest point.

Example 10

Ionomer (Surlyn 8940) Battery Housing and Microencapsulated Wax Filler

In this example, a battery having an ionomer housing and filled with microencapsulated wax was tested to determine how it is affected by a projectile impact. The housing was made of Surlyn 8940 using the same method described in Example 9. The interior of the battery was filled with the microencapsulated wax tested in Example 6. The battery was tested under the split shot scenario described above.

This combination of materials did not perform as well as the silicone oil filled batteries. Seconds after impact, the battery was engulfed in smoke and flames.

Example 11

Ionomer (Surlyn 6120) Battery Housing and Microencapsulated Sodium Bicarbonate Filler In this example, a battery having an ionomer housing and filled with microencapsulated sodium bicarbonate was tested to determine how it is affected by a projectile impact. The housing was made of Surlyn 6120 using the same method described in Example 9. The interior of the battery was filled with the microencapsulated sodium bicarbonate tested in Example 7. The battery was tested under the direct shot scenario described above.

This battery performed better than the one that was filled with microencapsulated wax, but it still did not prevent the battery from catching fire. Smoke poured out of the battery for four minutes after impact until the battery finally burst into flames. The entrance hole initially self-sealed, but the housing eventually melted and started to blacken and degrade. The housing around the exit hole burned and slumped away creating a 40 mm hole. The large hole allowed the microencapsulated sodium bicarbonate to fall away from the interior cells leaving without any thermal protection.

Illustrative Embodiments

Reference is made in the following to a number of illustrative embodiments of the subject matter described herein. The following embodiments illustrate only a few selected embodiments that may include the various features, characteristics, and advantages of the subject matter as presently described. Accordingly, the following embodiments should not be considered as being comprehensive of all of the possible embodiments. Also, features and characteristics of one embodiment may and should be interpreted to equally apply to other embodiments or be used in combination with any number of other features from the various embodiments to provide further additional embodiments, which may describe subject matter having a scope that varies (e.g., broader, etc.) from the particular embodiments explained below. Accordingly, any combination of any of the subject matter described herein is contemplated.

In one embodiment, a battery comprises a housing including an ionomer; and an electrochemical cell. The housing encloses the electrochemical cell. The ionomer may include acid groups, wherein at least some of the acid groups have been neutralized. At least some of the acid groups may have been neutralized with sodium and/or magnesium ions. The ionomer may include poly(ethylene-co-methacrylic acid). The ionomer may be part of a mixture that includes a flame retardant material. The flame retardant material may include decabromodiphenyl ether and/or antimony trioxide. The housing may include a mixture that includes the ionomer and expanding graphite. The housing may include a first layer of material coupled to a second layer of material, and wherein the material in the first layer includes the ionomer and the second layer forms a rigid outer shell of the housing. The battery may comprise microencapsulated wax in at least part of the space in the housing not taken up by the electrochemical cell. The battery may comprise microencapsulated carbonate salt in at least part of the space in the housing not taken up by the electrochemical cell. The battery may comprise silicone oil in at least part of the space in the housing not taken up by the electrochemical cell.

In another embodiment, a battery comprises a housing including a first layer of material coupled to a second layer of material, the material in the first layer including an ionomer; and an electrochemical cell. The housing encloses the electrochemical cell. The first layer and the second layer may be mechanically coupled together. The first layer and the second layer may be chemically coupled together. The second layer may include polycarbonate, acrylonitrile butadiene styrene, and/or polypropylene. The second layer may include glass fiber. The second layer may be on the exterior of the battery and the first layer may be on the interior of the battery. The material in the first layer may include poly(ethylene-co-methacrylic acid).

In another embodiment, a battery comprises an electrochemical cell; a housing that encloses the electrochemical cell; and silicone oil in at least part of the space in the housing not taken up by the electrochemical cell. The housing may include an ionomer. The ionomer may include acid groups, wherein at least some of the acid groups have been neutralized. The ionomer may include poly(ethylene-co-methacrylic acid).

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing Figs. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A battery comprising:
a housing including a layer comprising a self-sealing ionomer material; and
an electrochemical cell;
wherein the housing encloses the electrochemical cell; and
wherein the layer is at least 0.5 mm thick.

2. The battery of claim 1 wherein the self-sealing ionomer material includes acid groups, wherein at least some of the acid groups have been neutralized.

3. The battery of claim 2 wherein at least some of the acid groups have been neutralized with sodium and/or magnesium ions.

4. The battery of claim 1 wherein the self-sealing ionomer material includes poly(ethylene-co-methacrylic acid).

5. The battery of claim 1 wherein the self-sealing ionomer material is part of a mixture that includes a flame retardant material.

6. The battery of claim 5 wherein the flame retardant material includes decabromodiphenyl ether and/or antimony trioxide.

7. The battery of claim 1 wherein the housing includes a mixture of the self-sealing ionomer material and expanding graphite.

8. The battery of claim 1 wherein the layer is a first layer and the housing includes a second layer coupled to the first layer, and wherein the second layer forms a rigid outer shell of the housing.

9. The battery of claim 1 comprising microencapsulated wax in at least part of the space in the housing not taken up by the electrochemical cell.

10. The battery of claim 1 comprising microencapsulated carbonate salt in at least part of the space in the housing not taken up by the electrochemical cell.

11. The battery of claim 1 comprising silicone oil in at least part of the space in the housing not taken up by the electrochemical cell.

12. A battery comprising:
a housing including a first layer of material coupled to a second layer of material, the material in the first layer including a self-sealing ionomer material; and
an electrochemical cell;
wherein the housing encloses the electrochemical cell; and
wherein the first layer of material is at least 0.5 mm thick.

13. The battery of claim 12 wherein the first layer and the second layer are mechanically coupled together.

14. The battery of claim 12 wherein the first layer and the second layer are chemically coupled together.

15. The battery of claim 12 wherein the second layer includes polycarbonate, acrylonitrile butadiene styrene, and/or polypropylene.

16. The battery of claim 12 wherein the second layer includes glass fiber.

17. The battery of claim 12 wherein the second layer is on the exterior of the battery and the first layer is on the interior of the battery.

18. The battery of claim 12 wherein the material in the first layer includes poly(ethylene-co-methacrylic acid).

19. The battery of claim 12 comprising silicone oil in at least part of the space in the housing not taken up by the electrochemical cell.

20. The battery of claim 1 wherein the layer is at least 1 mm thick.

21. The battery of claim 12 wherein the first layer of material is at least 1 mm thick.

22. A battery comprising:
a housing including a layer comprising a self-sealing polymer material; and
an electrochemical cell;
wherein the housing encloses the electrochemical cell; and
wherein the layer is at least 0.5 mm thick.

23. The battery of claim 22 wherein the self-sealing polymer material includes poly(ethylene-co-methacrylic acid).

24. The battery of claim 23 wherein the poly(ethylene-co-methacrylic acid) is at least partially neutralized.

25. The battery of claim 22 wherein the self-sealing polymer material includes acid groups.

26. The battery of claim 25 wherein at least a portion of the acid groups are neutralized.

27. The battery of claim 26 wherein the acid groups are neutralized with sodium and/or magnesium ions.

28. The battery of claim 22 wherein the layer is a first layer and the housing includes a second layer coupled to the first layer, and wherein the second layer forms a rigid outer shell of the housing.

* * * * *